(12) United States Patent
Kolczyk et al.

(10) Patent No.: US 12,208,351 B2
(45) Date of Patent: Jan. 28, 2025

(54) FUNCTIONAL COMPONENT OF A FLUID FILTER, AND FLUID FILTER

(71) Applicant: MANN+HUMMEL GmbH, Ludwigsburg (DE)

(72) Inventors: Markus Kolczyk, Mundelsheim (DE); Marco Goedecke, Vaihingen (DE); Jobst Eisengraeber-Pabst, Oberstenfeld (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 463 days.

(21) Appl. No.: 17/154,666

(22) Filed: Jan. 21, 2021

(65) Prior Publication Data

US 2021/0138374 A1     May 13, 2021

Related U.S. Application Data

(63) Continuation of application No. PCT/EP2019/068969, filed on Jul. 15, 2019.

(30) Foreign Application Priority Data

Jul. 24, 2018   (DE) .......................... 102018117863.8

(51) Int. Cl.
*B01D 35/30*     (2006.01)
*B01D 29/11*     (2006.01)
(Continued)

(52) U.S. Cl.
CPC .............. *B01D 35/30* (2013.01); *B01D 29/11* (2013.01); *B01D 35/18* (2013.01);
(Continued)

(58) Field of Classification Search
CPC ........ B01D 35/30; B01D 29/11; B01D 35/18; B01D 2201/302; B01D 2201/4015;
(Continued)

(56) References Cited

U.S. PATENT DOCUMENTS 6,793,818 B1     9/2004   Entringer
2009/0289003 A1  11/2009  Tsai
(Continued)

FOREIGN PATENT DOCUMENTS

| DE | 102011088908 A1 | 5/2013 |
| EP | 0937490 A2 | 8/1999 |
| EP | 2857669 A2 | 4/2015 |

*Primary Examiner* — Madeline Gonzalez

(57) ABSTRACT

A functional component of a fluid filter is provided with at least one component connection element of a mechanical connection device, wherein the at least one component connection element can be connected releasably to at least one corresponding housing connection element of the mechanical connection device by a rotation/push-in movement about a virtual axis. The at least one corresponding housing connection element is provided at a filter housing of the fluid filter. The at least one component connection element has at least one securing contour that interacts with at least one joining element to secure the mechanical connection device and prevent an accidental release of the mechanical connection device, wherein the at least one joining element is connected to the filter housing after the functional component has been mounted at the filter housing.

10 Claims, 6 Drawing Sheets

(51) Int. Cl.
  *B01D 35/18* (2006.01)
  *F01M 11/03* (2006.01)
  *F01N 3/20* (2006.01)
  *F02M 37/32* (2019.01)

(52) U.S. Cl.
  CPC ............... *B01D 2201/302* (2013.01); *B01D 2201/4015* (2013.01); *B01D 2201/4076* (2013.01); *B01D 2201/4092* (2013.01); *F01M 11/03* (2013.01); *F01N 3/2066* (2013.01); *F01N 2610/1426* (2013.01); *F02M 37/32* (2019.01)

(58) Field of Classification Search
  CPC .... B01D 2201/4076; B01D 2201/4092; F01M 11/03; F01N 3/2066; F01N 2610/1426; F02M 37/32
  USPC .......................................... 210/184, 175, 186
  See application file for complete search history.

(56) References Cited

U.S. PATENT DOCUMENTS

2016/0089621 A1   3/2016  Morris
2016/0138538 A1*  5/2016  Ham ...................... F02M 37/32
                                                    210/96.1
2017/0292418 A1* 10/2017  Thalmann ................ F01P 11/12

\* cited by examiner

FUNCTIONAL COMPONENT OF A FLUID FILTER, AND FLUID FILTER

CROSS-REFERENCE TO RELATED APPLICATIONS

This application is a continuation application of international application No. PCT/EP2019/068969 having an international filing date of 15 Jul. 2019 and designating the United States, the international application claiming a priority date of 24 Jul. 2018 based on prior filed German patent application No. 10 2018 117 863.8, the entire contents of the aforesaid international application and the aforesaid German patent application being incorporated herein by reference.

BACKGROUND OF THE INVENTION

The invention concerns a functional component of a fluid filter, which comprises at least one component connection element of a mechanical connection device that can be releasably connected to at least one corresponding housing connection element of a filter housing of the fluid filter by means of a rotation/push-in movement about a virtual axis.

Moreover, the invention concerns a fluid filter with a filter housing and at least one functional component, wherein the filter housing comprises at least one fluid inlet for fluid to be purified and at least one fluid outlet for purified fluid and at least one filter element is arranged in the filter housing such that it separates the at least one fluid inlet from the at least one fluid outlet, wherein the at least one functional component comprises at least one component connection element of a mechanical connection device that can be releasably connected to at least one housing connection element of the filter housing by means of a rotation/push-in movement about a virtual axis.

EP 2 857 669 A2 discloses a filter device that permits separation of dirt particles from a fluid. The filter device comprises a filter housing in the geometrical shape of a cylinder which is dimensioned sufficiently large for accommodating a filter element. The filter housing comprises in a known manner a filter housing pot which is completed to the filter housing by a housing cover that can be screwed on or is welded on. At an end face of the housing cover facing away from the filter housing pot, a bayonet closure is attached which fastens a heating device with a heater housing to the filter housing. An electrical joining element is integrated in the heater housing in which an electrical supply can be connected.

SUMMARY OF THE INVENTION

It is the object of the invention to configure a functional component and a fluid filter of the aforementioned kind in such a way that an accidental release of the mechanical connection device between the functional component and the filter housing can be prevented.

This object is solved according to the invention for the functional component in that the at least one component connection element comprises at least one securing contour for preventing an accidental release of the mechanical connection device, wherein the at least one securing contour interacts in a securing manner with at least one joining element that can be connected to the filter housing after assembly of the functional component.

According to the invention, at least one securing contour is provided on the part of the functional component with which at least one joining element, which will be connected anyway to the filter housing after the functional component, can interact in a securing manner. For this purpose, the at least one joining element can have an outer shape with which it can engage the at least one securing contour for securing, or vice versa.

Advantageously, by means of the at least one securing contour and the at least one joining element a form-fit connection can be realized which can serve for securing against accidental release of the mechanical connection device. By connecting the at least one joining element to the filter housing, the securing action against accidental release is automatically activated. Additional securing components can be dispensed with in this manner. Also, no additional mounting step is needed.

The fluid filter can be a filter for liquid or gaseous fluid. The fluid can be advantageously fuel, lubricant, in particular oil, water, urea water solution, hydraulic liquid, air or the like.

The fluid filter can advantageously be a motor oil filter or fuel filter of an internal combustion engine.

The invention is however not limited to a motor oil filter or a fuel filter of an internal combustion engine. Instead, it can be used also in other types of liquid systems, in particular hydraulic systems, cooling systems, fluid systems with urea water solution or the like.

The invention can be used in motor vehicles, in particular passenger cars, trucks, buses, agricultural and/or construction vehicles, construction/agricultural machines, compressors, industrial engines or other devices, in particular with internal combustion engines. The invention can be used in connection with land vehicles, watercraft and/or aircraft.

Advantageously, the fluid filter can comprise at least one filter element which is arranged or can be arranged in the filter housing. For this purpose, the filter housing can be openable so that the at least one filter element can be exchangeably arranged in the interior of the filter housing. The filter housing can comprise a housing pot with an installation opening for the at least one filter element and a housing cover with which the installation opening can be closed, in particular so as to be openable again.

Advantageously, the filter housing can comprise at least one fluid inlet for fluid to be purified and at least one fluid outlet for purified fluid. The at least one filter element can be arranged in the filter housing such that it separates the at least one fluid inlet with respect to the at least one fluid outlet.

Advantageously, the at least one filter element can be a hollow filter element.

A hollow filter element is characterized in that it comprises at least one element interior which is surrounded by filter medium. The filter medium can be flowed through by the fluid to be purified from the exterior to the interior into the element interior, or in reverse. The element interior comprises a fluid passage to the exterior through which, depending on the flow direction, the purified fluid can exit from the element interior or fluid to be purified reaches the latter. The filter medium can surround the element interior circumferentially in relation to the element axis. On at least one end face that is axial in relation to the element axis, the filter medium can be connected to an end body, in particular an end disk. At least one end body can comprise at least one through opening for the element interior.

The hollow filter element can be advantageously a so-called round filter element with a round cross section, an oval round filter element with an oval cross section, a flat oval round filter element with a flattened oval cross section, a conical round filter element in which the round cross section tapers in axial direction relative to a main axis, a conical oval round filter element in which the oval cross section tapers in axial direction at least in direction of a transverse axis, a conical flat oval round filter element in which the flat oval cross section tapers in axial direction at least in direction of a transverse axis, or a hollow filter element with a different type of, in particular an angular, cross section and/or a different type of axial cross-sectional course in direction of an element axis.

The filter medium can advantageously be circumferentially closed or open in relation to the element axis. The filter medium can be in particular folded in a star shape, preferably zigzag-shaped or corrugated, or bent. The filter medium can also be not folded or not bent. The filter medium can be filter paper, filter nonwoven, or another medium suitable for filtering fluids.

A filter element in the meaning of the invention can also be referred to as filter insert.

In an advantageous embodiment, the at least one component connection element can comprise at least one securing contour at its radially outer circumferential side in relation to the axis. In this manner, the joining element can be arranged adjacent to the functional component. By engaging the securing contour from the side of the radially outer circumferential side, a rotation of the functional component relative to the filter housing can be prevented.

Advantageously, the at least one securing contour can be arranged at a radially outer circumferential side which is radially inwardly displaced in relation to the radially outermost circumferential side of the at least one component connection element. In this way, the component connection element can serve additionally as an axial stop for the at least one functional component.

In a further advantageous embodiment, at least one securing contour can comprise at least one depression and/or at least one securing contour can comprise at least one projection. A corresponding projecting contour on the part of the at least one joining element can engage a depression and prevent a rotation in this way. A projection can serve as a stop which can hit the projecting contour of the joining element and prevent a corresponding rotation of the functional component in this way.

In a further advantageous embodiment, the at least one securing contour can comprise at least one projection at least in opening rotational direction of the connection device or the at least one securing contour can comprise at least one projection in opening rotational direction and in closing rotational direction of the connection device, respectively. By means of a projection in opening rotational direction, it can be prevented that the connection is accidentally released.

With an additional projection in closing rotational direction, a mounting prevention can be realized. In this way, it can be ensured that the at least one joining element is placed precisely between two projections which are placed opposite each other in circumferential direction. In case the rotational orientation of the functional component and/or the configuration of the joining element is incorrect, mounting of the joining element can be prevented. As a whole, the functional safety of the fluid filter can be improved in this way.

The closing rotational direction is oppositely oriented in respect to the opening rotational direction.

In a further advantageous embodiment, the connection device can be of the bayonet closure type or can be screwable. A bayonet closure type connection device can be connected and released in a simple manner. Moreover, with a bayonet closure type connection device correspondingly large axial forces in relation to the axis can be transmitted.

The screwable connection device can be produced and mounted in a simple way. A screwable connection device is realized by means of a combined rotation/push-in movement, wherein the rotation movement, in turn, causes a push-in movement.

In a further advantageous embodiment, the functional component can be a heating device for fluid. By means of the heating device, the fluid, in particular fuel or motor oil, can be heated. In this way, the fluid can be brought to a temperature that is beneficial for the filtration and/or for its use. Also, freezing of the fluid can be prevented. In this way, the functional safety of the fluid filter can be further improved. Moreover, an efficiency for purifying the fluid can be improved.

In a further advantageous embodiment, at least one joining element can be a fluid conduit joining element and/or an electrical joining element. By means of a fluid conduit joining element, external fluid conduits can be connected to the fluid filter, in particular to at least one fluid inlet or to at least one fluid outlet. The fluid conduits can serve for supply of fluid to be purified or for discharge of purified fluid.

With an electrical joining element, corresponding external electrical conduits can be connected to the fluid filter.

Advantageously, the joining element can be provided with a quick connect device. In this way, the joining element can be connected quickly and easily to the fluid filter. The joining element can be designed with a rotatable and/or push-in connection, in particular a bayonet closure type connection, screw connection, plug-in connection, locking connection, clip connection or the like.

The at least one joining element can also be a combination of a fluid conduit joining element and an electrical joining element. In this way, with only one joining element the fluid connection as well as the electrical connection can be produced. In a further advantageous embodiment, a housing of a connection plug can be part of the at least one component connection element and can at least partially form at least one securing contour. In this manner, the heating device as a whole can be designed more flexibly.

In a further advantageous embodiment, a housing of an electrical connection plug can extend at a slant or perpendicular to the axis. In this way, the joining element can be pushed from the side onto or into the electrical connection plug.

In a further advantageous embodiment, the filter housing can comprise at least one securing counter contour which can interact in a securing manner with the at least one securing contour and the at least one joining element. In this way, a force introduction can be realized directly on the filter housing for the securing action.

In a further advantageous embodiment, at least one joining element can comprise at least one securing element which can interact at least with the at least one securing contour. In this manner, the joining element with respect to its shape can be designed more flexibly as a whole. The at least one securing element can be matched individually to the securing counter contour on the part of the filter housing.

Moreover, the object is solved according to the invention for the fluid filter in that the at least one component connection element comprises at least one securing contour for preventing an accidental release of the mechanical connection device, wherein the at least one securing contour interacts in a securing manner with at least one joining element that can be connected to the filter housing after assembly of the functional component.

In other respects, the features and advantages which have been disclosed in connection with the functional component according to the invention and the fluid filter according to the invention and their respective advantageous embodiments apply among each other correspondingly, and vice versa. The individual features and advantages can be combined among each other, of course, wherein further advantageous effects may result which exceed the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims expediently also individually and combine them to expedient further combinations.

In the Figures, same components are provided with same reference characters.

DESCRIPTION OF PREFERRED EMBODIMENTS

Figure 1:
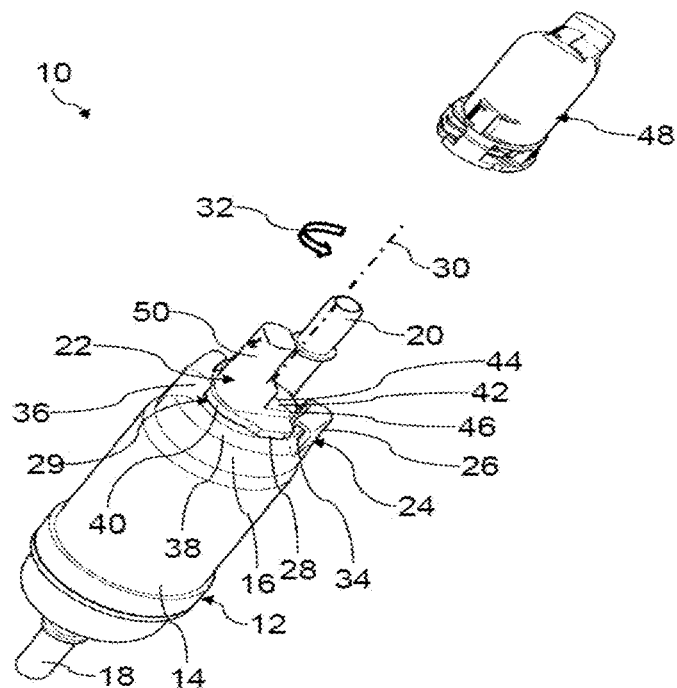
FIG. 1 shows an isometric view of a fluid filter in a first mounting phase upon attachment of a heating device according to a first embodiment.

In FIGS. 1 to 5, a fluid filter 10 for purifying fluids, for example, motor oil, fuel, urea water solution, water, hydraulic liquid or the like, according to a first embodiment is illustrated in different mounting phases and different perspectives. The fluid filter 10 can be arranged, for example, in a motor oil conduit, a fuel conduit or another fluid conduit of an internal combustion engine, for example, of a motor vehicle.

The fluid filter 10 comprises a filter housing 12 with a housing pot 14 on which a housing cover 16 is arranged, releasably in an exemplary fashion, for closing an opening of the housing pot 14.

The filter housing 12 comprises in the bottom of the housing pot 14 a tubular fluid outlet 18 for purified fluid. In the housing cover 16, the filter housing 12 comprises a tubular fluid inlet 20 for fluid to be purified. Alternatively, the fluid outlet 18 can be arranged in the housing cover 16 and the fluid inlet 20 in the housing pot 14. In this case, the filter housing 12 is flowed through in reverse direction by the fluid.

In the filter housing 12, a filter element, not shown in FIGS. 1 to 5, is arranged such that it separates the fluid inlet 20 from the fluid outlet 18.

Moreover, a functional component in the form of a heating device 22 is releasably mounted on the housing cover 16.

Figure 2:
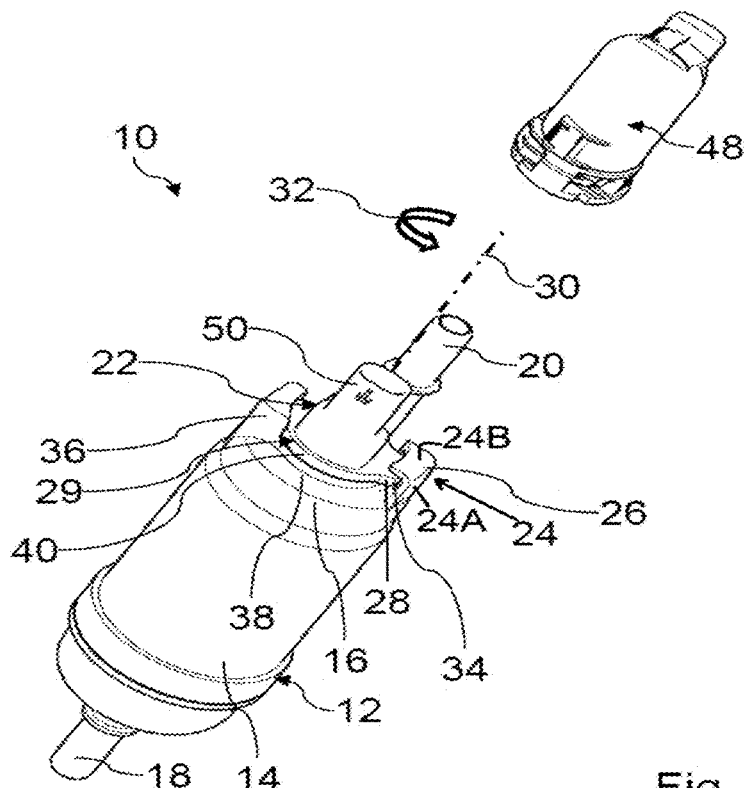
FIG. 2 shows an isometric view of the fluid filter of FIG. 1 in a second mounting phase.

The heating device 22 serves for heating the fluid, for example, after entering through the fluid inlet 20. As shown in FIGS. 1 and 2 the fluid inlet 20 may be tubular. As an example, the heating device 22 is operated electrically. The heating device 22 is connected releasably to the housing cover 16 by means of a mechanical connection device 24 in the form of a bayonet closure type connection.

The connection device 24 comprises on the part of the housing cover 16 two housing connection elements in the form of bayonet receptacles 26. As shown in FIGS. 1 and 2, the mechanical connection device 24 has a first leg 24A projecting axially outwardly away from the axial outer side of the housing cover 16; and a second leg 24B arranged on an axial outer end of the first leg 24A and projecting radially inwardly in a direction transverse to the first leg. An axial spacing between the axial outer side of the housing cover 16 and the second leg 24B forms the bayonet receptacles 26. On the part of the heating device 22, two corresponding bayonet noses 28 of a component connection element 29 are arranged. The connection device 24 can be activated by rotation of the heating device 22 relative to the housing cover 16 in a closing rotational direction 32 about a virtual axis 30 and can be released by rotation opposite to the closing rotational direction 32.

When in the following "radial", "axial", "circumferential", "coaxial" or the like is mentioned, this relates to the axis 30, if nothing else is mentioned.

The bayonet receptacles 26 are arranged on radially opposed sides. Each bayonet receptacle 26, viewed in the closing rotational direction 32, is provided at the front with an insertion opening 34. At the rearward side, viewed in closing rotational direction 32, each bayonet receptacle 26 is closed by a stop 36.

The bayonet receptacles 26 are spaced apart from each other in circumferential direction so that a circumferential gap 38 is provided between the bayonet receptacles 26, respectively. The bayonet noses 28 can be inserted in axial direction through the gaps 38 and, by subsequent rotation in the closing rotational direction 32, can be introduced through the insertion openings 34 into the bayonet receptacles 26.

The bayonet noses 28 are realized as radial projections at a bayonet plate 40.

At the side of the bayonet plate 40 which is axially facing away from the housing pot 14, a securing contour 42 is realized. The securing contour 42, bayonet plate 40, and the bayonet noses 28 belong to the component connection element 29 of the connection device 24.

Figure 3:
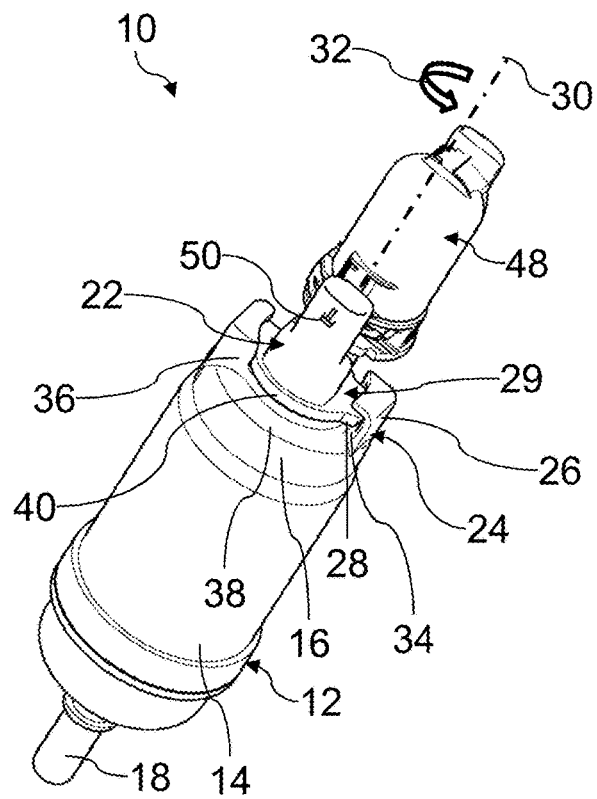
FIG. 3 shows an isometric view of the fluid filter of FIGS. 1 and 2 in a third mounting phase during attachment of a fluid conduit joining element.
Figure 5:
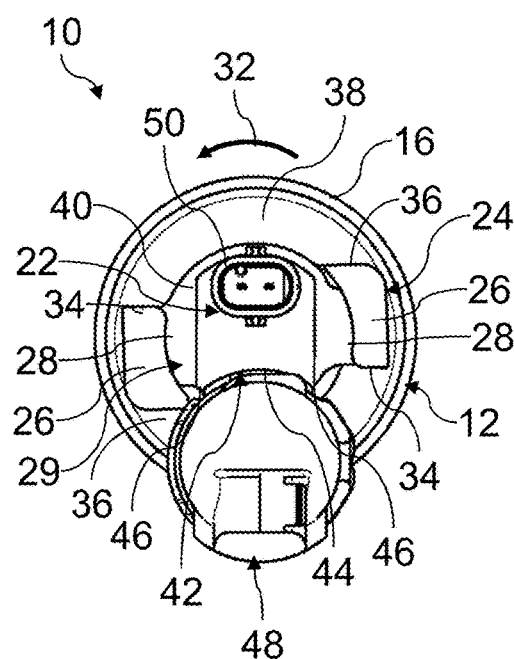
FIG. 5 is a plan view of the fluid filter of FIG. 3 in the third mounting phase.
Figure 6:
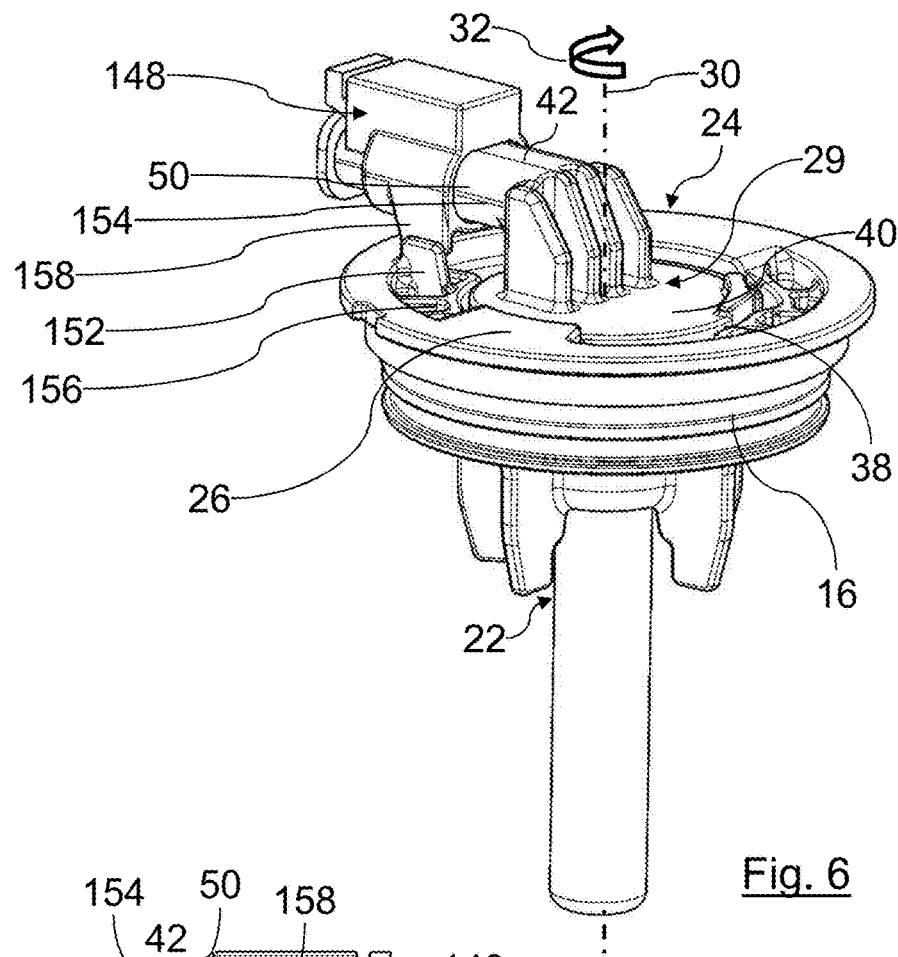
FIG. 6 is an isometric view of a housing cover of a fluid filter with a heating device according to a second embodiment.
Figure 7:
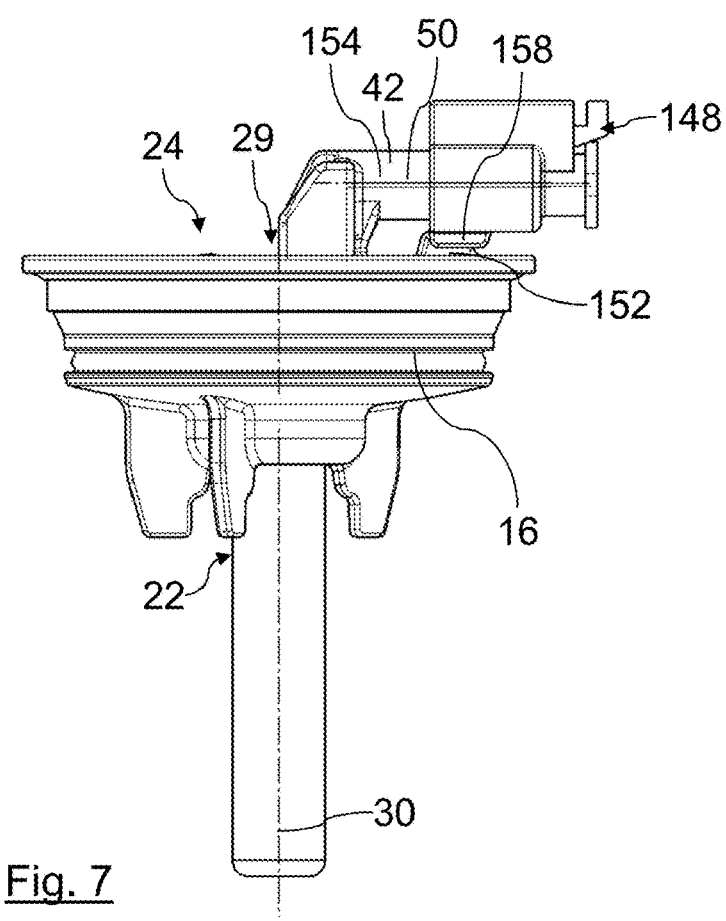
FIG. 7 is a side view of the housing cover with the heating device of FIG. 6.
Figure 8:
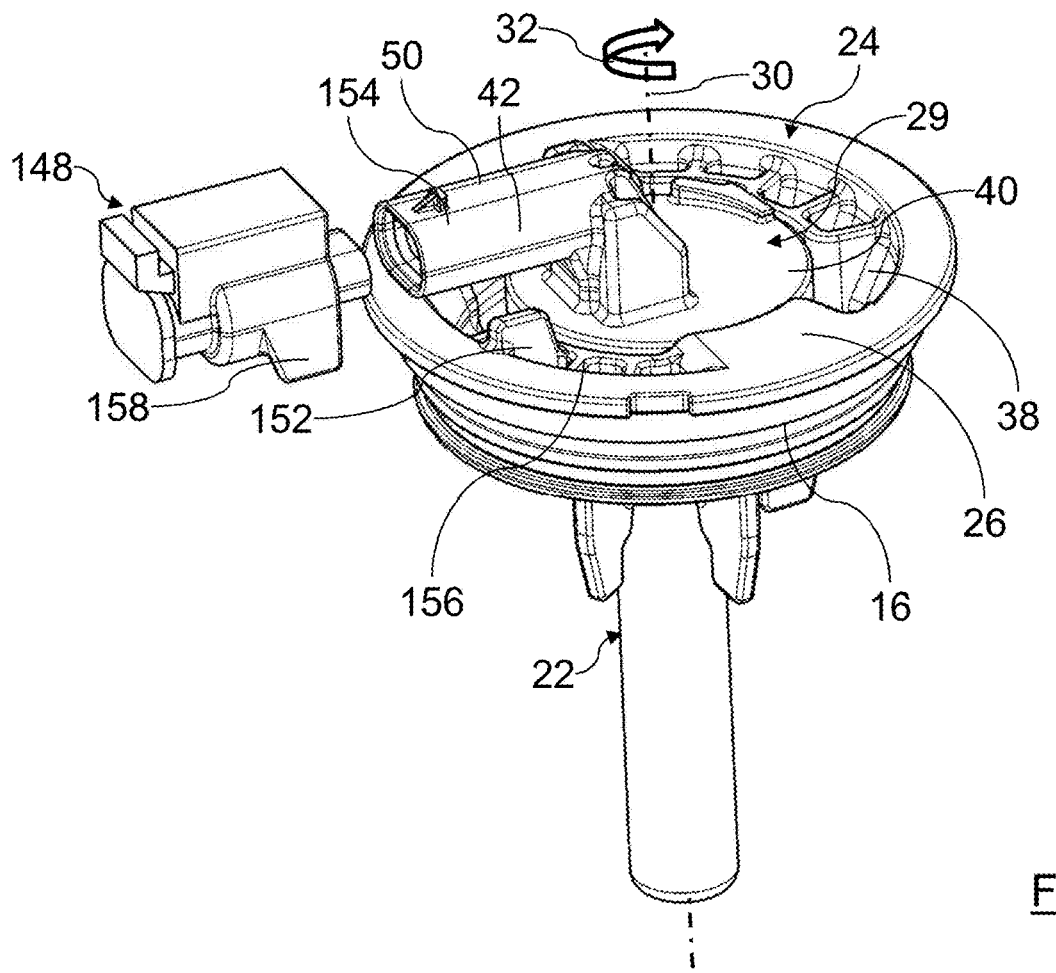
FIG. 8 is an isometric view of the housing cover with the heating device of FIGS. 6 and 7, wherein a joining element is shown prior to assembly at an electrical connection plug of the heating device.
Figure 9:
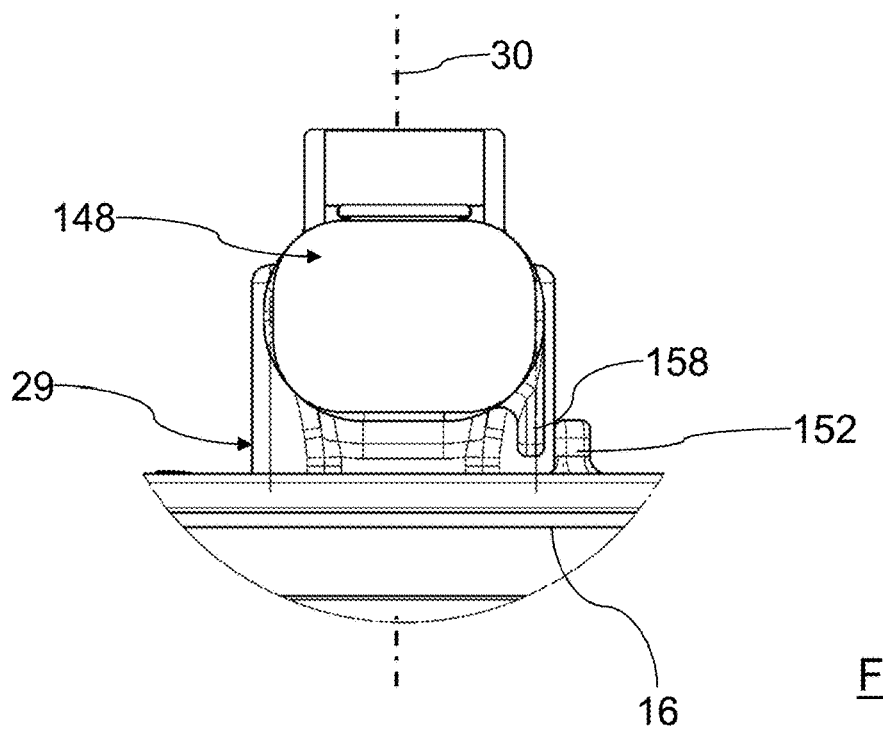
FIG. 9 shows a detail view from the side of the housing cover with the heating device of FIGS. 6 to 8 in the region of the mounted joining element.
Figure 10:
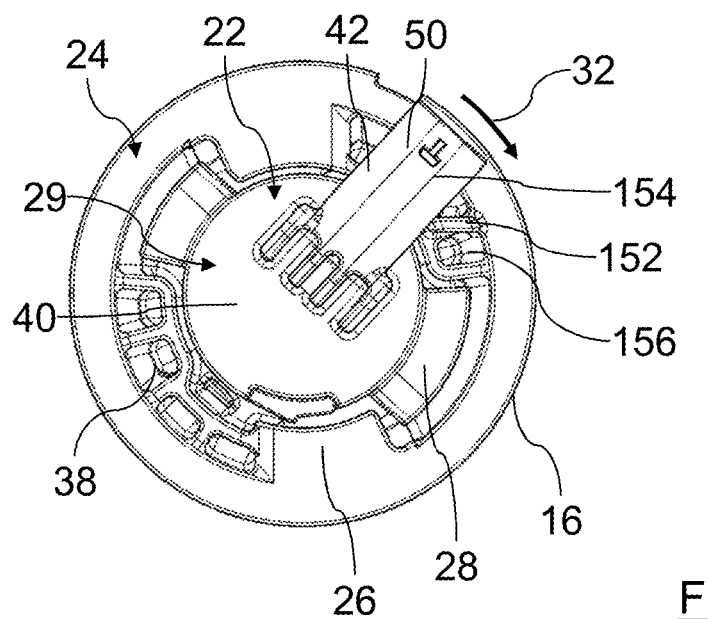
FIG. 10 shows a plan view of the housing cover with the heating device in a first mounting phase.
Figure 11:
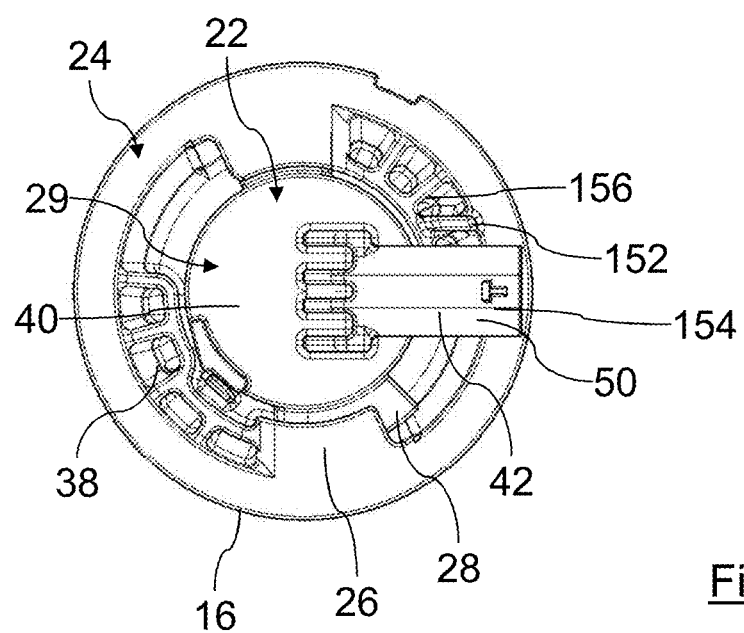
FIG. 11 shows a plan view of the housing cover with the heating device in a second mounting phase.
Figure 12:
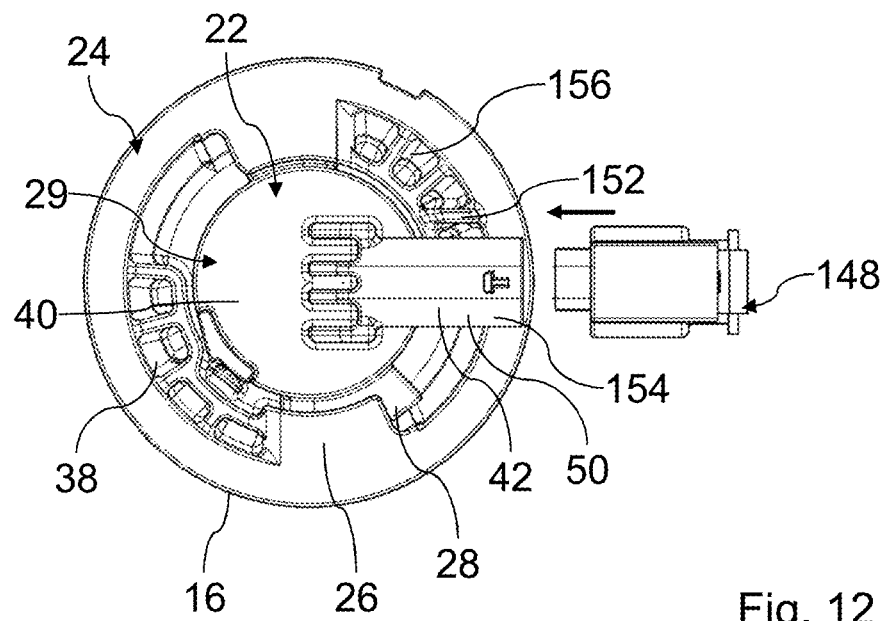
FIG. 12 shows a plan view of the housing cover with the heating device in a third mounting phase.
Figure 13:
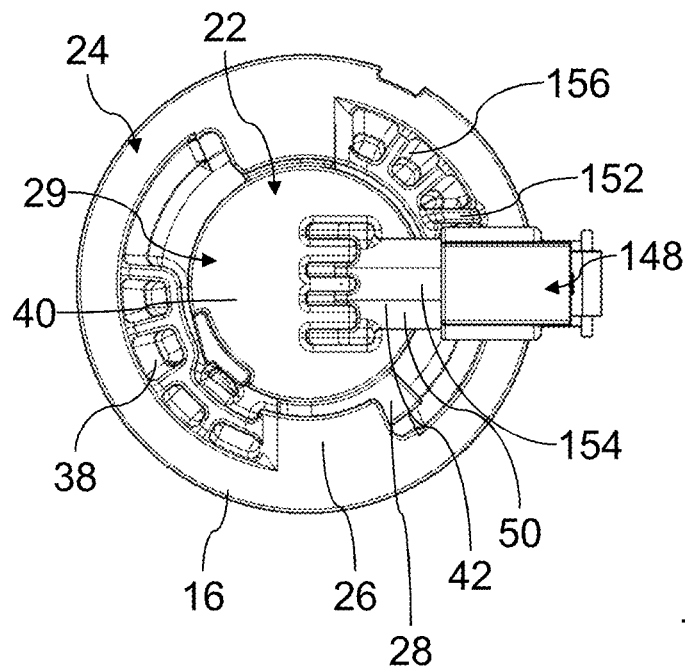
FIG. 13 shows a plan view of the housing cover with the heating device in a fourth mounting phase.

The securing contour 42 comprises a depression 44 at its side which is radially facing away from the axis 30. The depression 44 is delimited, viewed in circumferential direction in relation to the axis 30, at the front and the rear by a projection 46, respectively. When the fluid filter 10 is completely mounted, as shown in FIGS. 3, 5, the securing contour 42 interacts with an outer contour, that is approximately of a circular cylinder shape as an example, of a fluid conduit joining element 48 in such a way that the connection device 24 is secured against accidental release.

The securing contour 42 is arranged at a radially outer circumferential side of the component connection element 29 which is displaced radially inwardly relative to the radially outermost circumferential side, namely the radially outer circumferential side of the bayonet plate 40. In this way, the bayonet plate 40 can act as a stop for the fluid conduit joining element 48 in axial direction.

The fluid conduit joining element 48 serves for connecting an external fluid conduit, not shown in FIGS. 1 to 5, to the fluid inlet 20. For this purpose, the fluid conduit joining element 48 is pushed axially onto the fluid inlet 20.

In the following, the attachment of the heating device 22 and of the fluid conduit joining element 48 to the filter housing 12 will be described.

First, the heating device 22 with the bayonet plate 40 leading is pushed in axial direction onto the housing cover 16. In this context, it may be necessary to rotate the heating device 22 about the axis 30 such that the bayonet noses 28 can be guided through the gaps 38. This mounting phase is shown in FIG. 1.

Figure 4:
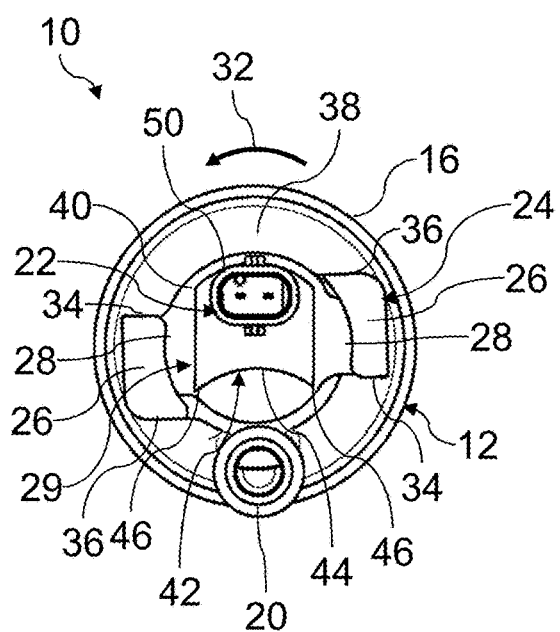
FIG. 4 is a plan view of the fluid filter of FIG. 2 in the second mounting phase.

Subsequently, the heating device 22 is rotated in the closing rotational direction 32 so that the bayonet noses 28 can be guided through the insertion openings 34 into the respective bayonet receptacles 26. In the correct closing position, the securing contour 42 is arranged on the side which is facing the fluid inlet 20. This mounting phase is illustrated in FIGS. 2 and 4.

Subsequently, the fluid conduit joining element 48 is pushed onto the fluid inlet 20. In this context, the circumferential side of the fluid conduit joining element 48 engages the depression 44. The axial end face of the fluid conduit joining element 48 hits the axially facing side of the bayonet plate 40. This mounting phase is illustrated in FIGS. 3 and 5.

In the final mounting position which is illustrated in FIGS. 3 and 5, the projecting circumferential side of the fluid conduit joining element 48 interacts in a securing manner with the depression 44 and the projections 46 of the securing contour 42. By means of the projection 46 leading in the closing rotational direction 32, it is prevented that the heating device 22 can be rotated accidentally against the closing rotational direction 32, i.e., in the opening rotational direction. By means of the projection 46 to the rear in the closing rotational direction 32, mounting of the fluid conduit joining element 48 is prevented in case its outer contour does not fit the securing contour 42.

Finally, electrical connecting lines, not illustrated, are connected to the electrical connection plug 50 of the heating device 22.

For detaching the heating device 22, the electrical connecting lines are removed from the electrical connection plug 50. The fluid conduit joining element 48 is pulled off the fluid inlet 20. In this way, the securing contour 42 is released so that the heating device 22 can be rotated opposite to the closing rotational direction 32 relative to the housing cover 16 and the connecting device 24 can be released in this way. The heating device 22 can now be separated from the filter housing 12.

In FIGS. 6 to 13, a heating device 22 is shown in a housing cover 16 of a fluid filter according to the second embodiment in different perspectives and mounting states, wherein FIGS. 10 to 13 show the heating device 22 in different mounting phases upon installation in the housing cover 16. Those elements that are similar to those of the first embodiment of FIGS. 1 through 5 are provided with the same reference characters. The second embodiment differs from the first embodiment in that in the second embodiment a securing contour 42 is realized at a housing 154 of the connection plug 50. The housing 154 with the securing contour 42 belongs to the component connection element 29 of the connection device 24. The housing 154 extends perpendicular to the axis 30 radially outwardly and projects thus past an annular section 156 of the housing cover 16 with the bayonet receptacles 26.

In the annular section 156 of the housing cover 16, a securing counter contour 152 in the form of a web is arranged. The securing counter contour 152 extends in axial and radial direction. With inserted heating device 22, the axial free rim of the securing counter contour 152 ends below the securing contour 42. In this manner, upon rotation of the heating device 22 about the axis 30 for closing and opening the bayonet connection of the connection device 24, the securing counter contour 152 can be moved past the rim of the securing contour 42.

In the end position of the heating device 22, when the bayonet noses 28 are positioned correctly in the bayonet receptacles 26, the free rim of the securing counter contour 152 is located obliquely below the securing contour 42 at the side facing away in the closing rotational direction 32.

The securing action is activated by pushing on the joining element 148. The joining element 148 comprises for this purpose a securing projection 158. The securing projection 158 is located at the side of the joining element 148 which is facing the securing counter contour 152. With mounted joining element 148, the securing projection 158 engages from behind the securing counter contour 152 and prevents in this way that the heating device 22 can be rotated opposite to the closing rotational direction 32.

What is claimed is:

1. A functional component of a fluid filter, comprising:
a heating device for heating a fluid configured to rotate in a closing rotational direction about a virtual axis of rotation for installation onto a filter housing configured to receive the heating device, the heating device comprising:
a component connection element having:
a bayonet plate extending radially in a direction transverse to the virtual axis of rotation, the bayonet plate having:
at least one bayonet nose arranged on and projecting radially outwardly away from a radial outer circumference of the bayonet plate, the at least one bayonet nose configured and positioned to be received into a bayonet receptacle of the filter housing by rotation of the heating device in the closing rotational direction about the virtual axis of rotation when mounting the heating device releasably onto the filter housing configured to receive the heating device;
the heating device further comprising:
an electrical connection plug with a housing and arranged on an axial outer surface of the bayonet plate of the heating device and having:
a securing contour formed as a concave depression formed on a radial outer side of the housing of the electrical connection plug, the concave depression extending radially inwardly on the bayonet plate, wherein the securing contour is configured to be complementary to a separate joining element, the joining element being a quick connect device which may be attached to the filter housing when the functional component is connected; and wherein the securing contour and the joining element share a form-fit connection when connected to the filter housing such that removal of the functional component is not possible.

2. A functional component of a fluid filter comprising:
a filter housing surrounding a virtual axis, comprising
  a housing pot;
  a housing cover arranged on and closing over an axial end face of the housing pot;
  a tubular fluid inlet arranged on an axial outer side of the housing cover;
  at least one mechanical connection device arranged on the axial outer side of the housing cover, the at least one mechanical connection device having:
    a first leg projecting axially outwardly away from the axial outer side of the housing cover; and
    a second leg arranged on an axial outer end of the first leg and projecting radially inwardly in a direction transverse to the first leg,
    wherein an axial spacing between the axial outer side of the housing cover and the second leg forms a bayonet receptacle;
a heating device for heating a fluid, comprising:
  a component connection element having:
    a bayonet plate extending radially in a direction transverse to the virtual axis, the bayonet plate arranged at the axial outer side of the housing cover, the bayonet plate having:
      at least one bayonet nose arranged on and projecting radially outwardly away from an outer circumference of the bayonet plate, the at least one bayonet nose configured and positioned to be received into the bayonet receptacle by rotation of the heating device on the axial outer side of the housing cover into a mounting position, mounting the heating device releasably onto the filter housing,
      wherein the bayonet plate is rotatable on the axial outer side of the housing cover in a rotation direction about the virtual axis;
  wherein the heating device includes a concave depression extending radially inwardly and arranged at an axially outer side of the bayonet plate;
a fluid conduit joining element pushed onto and received onto an axial outer end of the tubular fluid inlet, the fluid conduit joining element comprising:
  a radially outer securing contour configured to be received into the concave depression of the heating device is rotated into the mounting position, the radially outer securing contour engaging the concave depression to form a form-fit connection and preventing rotation of the heating device away from the mounting position;
wherein the fluid conduit joining element is configured to be installed onto the tubular fluid inlet after the heating device has been mounted at the filter housing.

3. The functional component according to claim 2, wherein the at least one bayonet nose is two bayonet noses, each arranged at opposite sides of the bayonet plate and with the concave depression arranged therebetween,
  a first one of the two bayonet noses arranged in an opening rotational direction relative to the concave depression and;
  a second one of the two bayonet noses arranged in a closing rotational direction relative to the concave depression.

4. The functional component according to claim 2, wherein the mechanical connection device is a bayonet closure or the mechanical connection device is screwable.

5. The functional component of claim 2, further comprising the functional component being arranged at a first end face of the filter housing when connected, the first end face at which the tubular fluid inlet is arranged.

6. The functional component of claim 5, further comprising the first end face being opposite a second end face of the filter housing through which a fluid outlet is arranged.

7. The functional component of claim 5, wherein the functional component is arranged adjacent to the tubular fluid inlet.

8. The functional component of claim 2, wherein the functional component is configured to heat the fluid being filtered.

9. The functional component according to claim 2, further comprising:
  an electrical connection plug arranged on the axially outer side of the bayonet plate;
  wherein the concave depression is formed into a housing of the electrical connection plug.

10. The functional component according to claim 2, wherein
  the bayonet receptacle is closed at an end by a stop positioned to interact with the at least one bayonet nose when the component connection element is rotated into the mounting position in the bayonet receptacle.

* * * * *